United States Patent
Hooper et al.

(10) Patent No.: US 7,035,895 B1
(45) Date of Patent: Apr. 25, 2006

(54) MANAGER OBJECT FOR MANAGEMENT OF MULTIPLE RESOURCES ON DATALESS CLIENTS IN A DISTRIBUTED COMPUTING ENVIRONMENT

(75) Inventors: Jason James Hooper, Austin, TX (US); Jerry Frain, Round Rock, TX (US); James F. Kelton, Liberty Hill, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/213,907

(22) Filed: Dec. 17, 1998

(51) Int. Cl.
*G06F 15/16* (2006.01)

(52) U.S. Cl. .................... 709/201; 709/229

(58) Field of Classification Search ................ 709/201, 709/223–224, 202, 203, 230, 315, 316, 328; 713/200, 201; 345/329; 710/60; 707/2; 717/137
See application file for complete search history.

(56) References Cited

U.S. PATENT DOCUMENTS

| | | | | |
|---|---|---|---|---|
| 5,261,080 A * | 11/1993 | Khoyi et al. | .................. | 710/60 |
| 5,265,206 A * | 11/1993 | Shackelford et al. | ........ | 709/316 |
| 5,440,744 A * | 8/1995 | Jacobson et al. | ........... | 709/203 |
| 5,699,518 A * | 12/1997 | Held et al. | .................. | 709/229 |
| 5,754,763 A * | 5/1998 | Bereiter | ...................... | 713/201 |
| 5,860,010 A * | 1/1999 | Attal | ........................... | 717/137 |
| 5,958,012 A * | 9/1999 | Battat et al. | ................ | 709/224 |
| 5,961,595 A * | 10/1999 | Kawagoe et al. | ........... | 709/223 |
| 6,035,399 A * | 3/2000 | Klemba et al. | ............. | 713/200 |
| 6,085,197 A * | 7/2000 | Federighi et al. | ........... | 707/102 |
| 6,101,527 A * | 8/2000 | Lejeune et al. | ............. | 709/201 |
| 6,134,540 A * | 10/2000 | Carey et al. | .................... | 707/2 |
| 6,134,581 A * | 10/2000 | Ismael et al. | ............... | 709/202 |
| 6,134,594 A * | 10/2000 | Helland et al. | ............. | 709/229 |
| 6,181,336 B1 * | 1/2001 | Chiu et al. | .................... | 345/329 |
| 6,219,717 B1 * | 4/2001 | Filkovsky et al. | .......... | 709/315 |
| 6,226,691 B1 * | 5/2001 | Cantin et al. | ............... | 719/316 |
| 6,233,623 B1 * | 5/2001 | Jeffords et al. | ............. | 709/316 |
| 6,253,243 B1 * | 6/2001 | Spencer | ...................... | 709/224 |
| 6,275,871 B1 * | 8/2001 | Reinfelder et al. | ......... | 709/328 |
| 6,282,568 B1 * | 8/2001 | Sondur et al. | .............. | 709/223 |
| 6,330,586 B1 * | 12/2001 | Yates et al. | .................. | 709/201 |
| 6,363,421 B1 * | 3/2002 | Barker et al. | ............... | 709/223 |
| 6,393,481 B1 * | 5/2002 | Deo et al. | .................... | 709/224 |
| 6,487,590 B1 * | 11/2002 | Foley et al. | ................. | 709/223 |

OTHER PUBLICATIONS

TME 10 Framework version 3.2: An Introduction to the Lightweight Client Framework, Oct. 1997.*

* cited by examiner

*Primary Examiner*—Thong Vu
(74) *Attorney, Agent, or Firm*—Jeffrey S. LaBaw; Joseph R. Burwell; David Judson

(57) ABSTRACT

A method of managing a set of clients in a distributed computer network having a management server. A given client preferably includes a dataless management framework. According to the method, a manager object is associated to each application to be managed on a given client. The manager object preferably includes a registry composed of a set of elements, with each element corresponding to an instance of the application. The element comprises a data set of information representing a context of the application instance. All application instances are then managed through the manager object.

23 Claims, 4 Drawing Sheets

MANAGER OBJECT FOR MANAGEMENT OF MULTIPLE RESOURCES ON DATALESS CLIENTS IN A DISTRIBUTED COMPUTING ENVIRONMENT

BACKGROUND OF THE INVENTION

1. Technical Field

The present invention is directed to managing a large distributed computer network. More particularly, the present invention is related to the field of application management in a large enterprise network.

2. Description of the Related Art

Enterprises now desire to place all of their computing resources on a computer network. To this end, it is known to connect computers in a large, geographically-dispersed network environment and to manage such an environment in a distributed manner. One such management framework, the Tivoli Managed Environment™, comprises a server that manages a number of nodes, each of which has a local object database that stores object data specific to the local node. Each managed node typically includes a management framework, comprising a number of management routines, that is capable of a relatively large number (e.g., hundreds) of simultaneous network connections to remote machines. The framework manages hundreds of megabytes of local storage and can spawn many dozens of simultaneous processes to handle method requests from local or remote users. Of these nodes, only a small percentage are file servers, name servers, database servers, or anything other than end-of-wire or ❋endpoint❋ machines. The majority of the network machines are simple personal computers (PCs) or workstations that see little management activity during a normal day.

Among the many features of the Tivoli ME system is the use of a lightweight client framework ("LCF"). The LCF is software that runs on an endpoint computer and that allows the management system to communicate with and manipulate the client computer. The LCF includes a query agent that starts up and executes as needed to respond to management queries directed to the node. In the LCF, preferably the storage of management data on the client computer is substantially eliminated. An LCF-supported client is thus sometimes referred to as "dataless". This architecture minimizes the chance of corruption of management data by users.

Management operations on a dataless client, e.g., installing new software or checking memory usage, are often performed on a machine as a whole. However, there are often applications or subsystems running on a machine that require a finer granularity of management as combined to the overall machine. These applications typically are those that have multiple installations or "instances" running independently. An example is a relational database system where multiple database instances of the application service different business applications (e.g., accounting and human resources). To manage these applications, it is desirable and often necessary to target operations at a specific application instance. As noted above, however, to conserve resources, the local query agent typically is only started upon receipt of the management query. When started, this routine does not necessarily know about the different application instances that may be executing on the machine, which complicates the management operation.

The present invention addresses this problem.

BRIEF SUMMARY OF THE INVENTION

According to the invention, an entity, sometimes referred to as a "manager", is created to represent each application type running on a client. The manager, which may reside anywhere in the distributed network, is the target of management operations. It then redirects those operations to the appropriate client node.

The manager preferably comprises a control routine, together with a registry comprising a set of one or more elements. Each element includes a data set of information describing a context of a given application instance executing on the client. Typical context information includes client node identity, installation location (e.g., directory), installation identifier (e.g., database server name), administrator username/password details, and the like. When a query is performed by a management server, the manager preferably relays the query to the client node after augmenting it with the appropriate context information. Upon receipt of the query at the client, a query agent is started. The context information is then used by a local query agent to identify which of the many installed instances of the application to target for the management operation.

The manager may also include or use a discovery mechanism to discover existing applications (and their application instances) on a client node. Alternatively, information about application types (and associated application instances) are explicitly registered with the client manager in a registration process. According to the present invention, the manager preferably fully specifies the identity of an application instance targeted for a management operation.

In one aspect, the present invention describes a method of managing a set of clients in a distributed computer network having a management server. A given client preferably includes a dataless management framework. According to the method, a manager object is associated to each application type (to be managed) on a given client. The manager object preferably includes a registry comprising a set of one or more elements. Preferably, there is one element per application instance. The element includes a data set of information representing a context of the application instance. According to the invention, all instances of the application are then managed through the application's manager object.

According to another aspect of the invention, a manager object is provided for use in managing an application of a given type executing on a client machine. The manager object comprises a control routine, together with a registry of elements. Each element includes a data set of information representing a context of a given application instance. The routine intercepts a query directed to the client machine for managing the application, modifies the query with the information, and then redirects the modified query to the client machine to target management of the application instance directly.

According to yet another aspect of the invention, a management framework is provided for use in distributed management operations. The framework comprises a management server to which a set of clients to be managed are connectable and, for each client, a set of manager objects. As noted above, each manager object is associated with a given application to be managed at the client and is responsive to management operations initiated at the management server for directly managing instances of the application.

Thus, it is a more general object of the present invention to provide a set of manager objects for managing applications (and their associated instances) on a dataless client in large managed environment. In one embodiment, there is one manager object per application type.

Another more general object of this invention is to provide a finer degree of management control over a client machine operating in a distributed computer environment.

Still another object of the present invention is to provide a system that effectively manages multiple applications (and their associated application instances) in a managed environment comprising a set of dataless clients connected to a management server.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
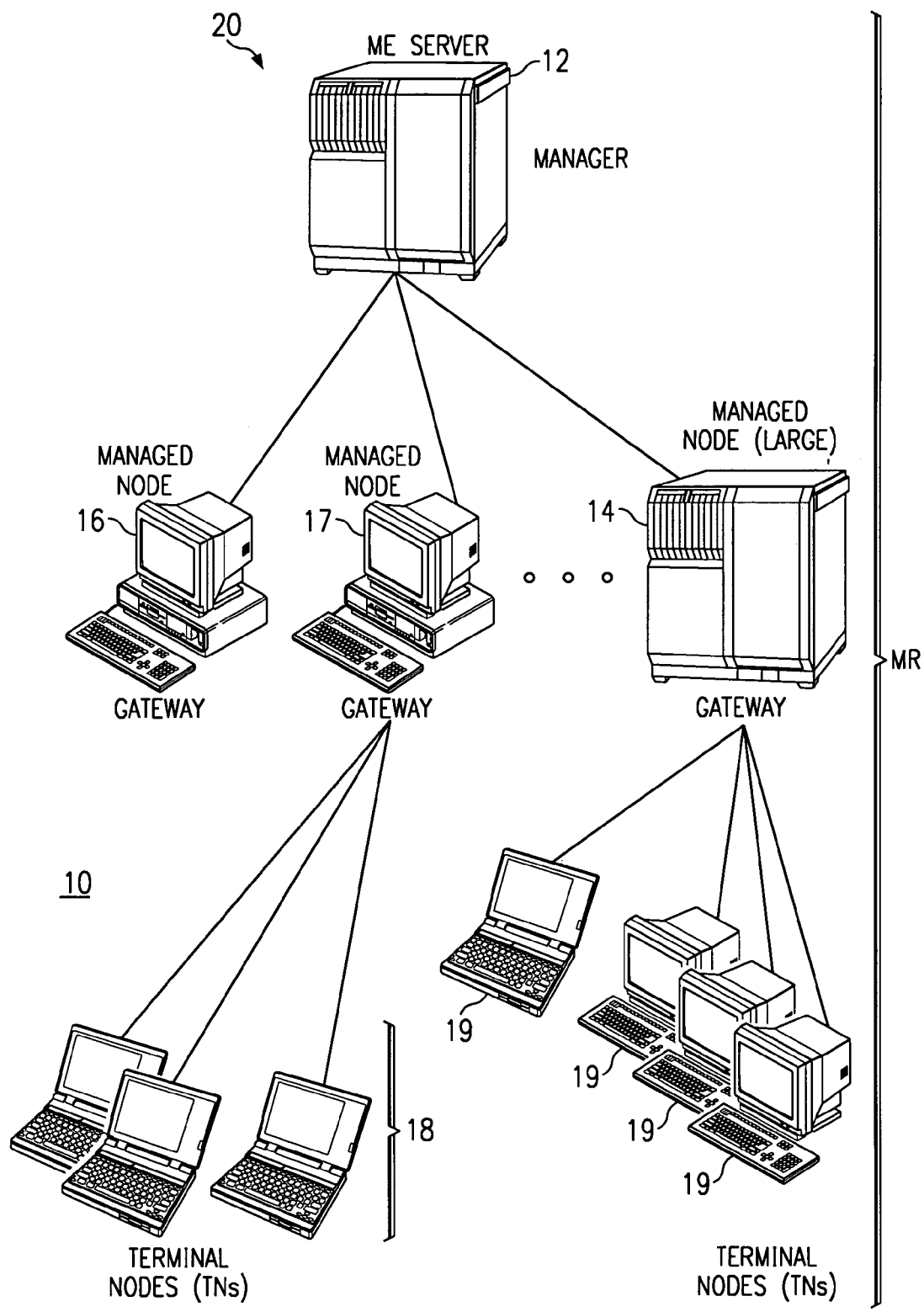
FIG. 1 illustrates a simplified diagram showing a large distributed computing enterprise environment in which the present invention is implemented.

Referring now to FIG. 1, the invention is preferably implemented in a large distributed computer environment 10 comprising up to thousands of ⁂nodes⁂. The nodes typically are geographically dispersed and the overall environment is said to be ⁂managed⁂ in a distributed manner. Preferably, the management environment (ME) is broken down logically into a series of loosely-connected managed regions (MR), each with its own management server 12 for managing local resources within the MR. The network typically includes other servers (not shown) for carrying out other distributed network functions. These include name servers, security servers, file servers, thread servers, time servers and the like. Multiple servers 12 coordinate activities across the enterprise and permit remote site management and operation. Each server 12 serves a number of gateway machines 14, 16 and 17, each of which in turn support a plurality of endpoints 18 and 19. In this configuration, gateway 14 also is a server. Server 12 preferably coordinates all activity within the MR.

Servers 12 and 14 provide network resources such as data storage space, application services and many other services known to be provided by servers in a network. Preferably, the servers 12 and 14 are computers including a IBM RS/6000® processor running the AIX operating system, preferably version 3.2.5 or greater. Suitable alternative machines include an IBM-compatible PC x86 or higher running Windows NT® or LINUX, a Data General AViion® series running DG/UX version 4.2, SCO UnixWare® 2.1 or greater, a Hewlett Packard 9000/700 or 800 series running HP UX 9.0 or greater, a Compaq AlphaServer® running Digital UNIX or Windows NT, or a Sun Enterprise 10000 series running Solaris® 7. Of course, other machines and/or operating systems may be used as well for the server machines.

Workstations 16, 17 and 19 are connected directly to the network using known techniques such as Ethernet networks, token ring networks, and the like. Wireless connections may also be used. Workstations 16, 17 and 19 are preferably IBM-compatible x86 personal computers running IBM OS/2®, Windows® 98 or NT®. Alternative Unix based workstations produced by IBM, Sun, Hewlett-Packard and others may be used as well. In this illustrative example, workstation 17 serves as a dial-up server for laptop computers 18. This provides convenient access for mobile users. Laptop computers 18 are preferably x86 based machines such as the IBM Thinkpad® series running a suitable operating system such as IBM OS/2® or Windows® 98.

Figure 2:
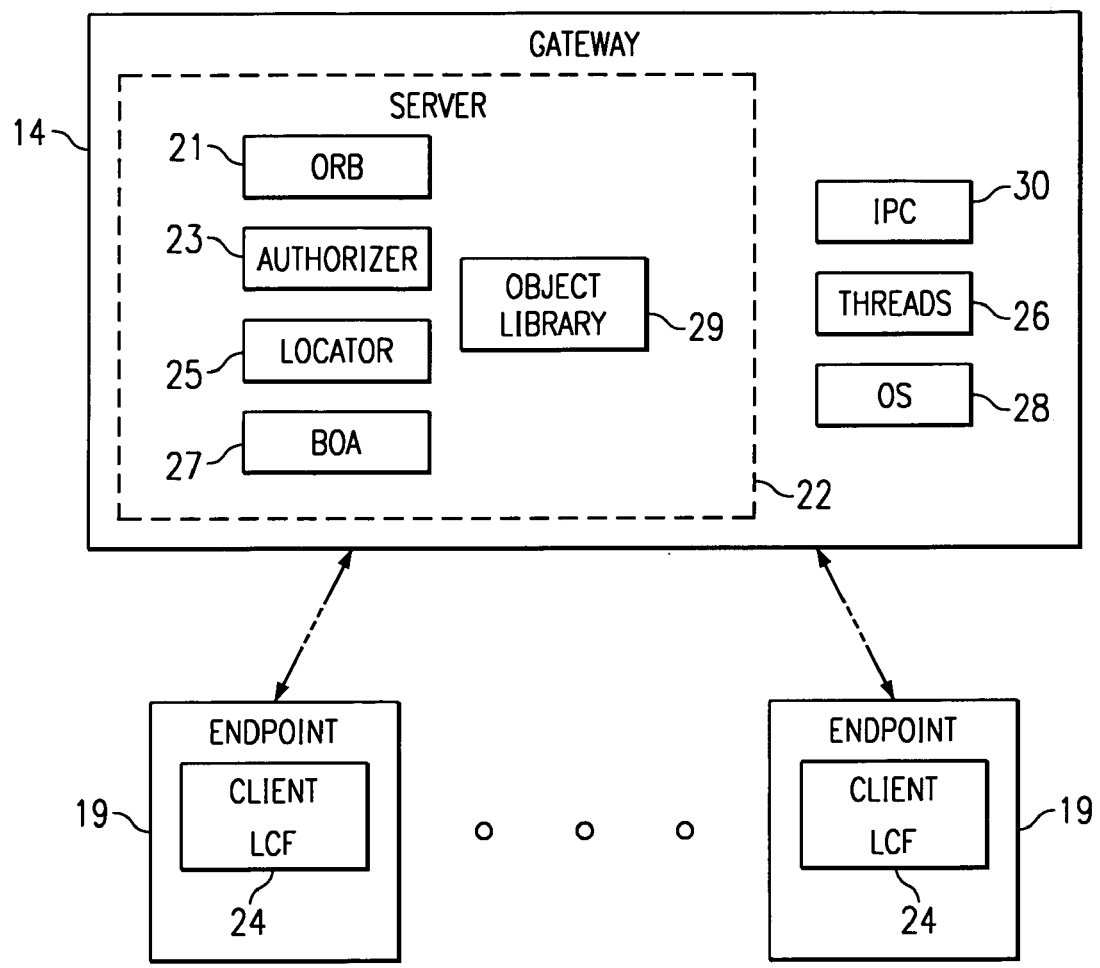
FIG. 2 is a block diagram of a preferred system management framework illustrating how the framework functionality is distributed across the gateway and its endpoints within a managed region.

Referring now to FIG. 2, each gateway machine, such as server 14, preferably runs a server component 22 of a system management framework. The server component 22 is a multi-threaded runtime process that comprises several components: an object request broker or ⁂ORB⁂ 21, an authorization service 23, object location service 25 and basic object adapter or ⁂BOA⁂ 27. Server component 22 also includes an object library 29. Preferably, the ORB 21 runs continuously, separately from the operating system, and communicates with both server and client processes through separate inter-process communication (IPC) facilities 30. In particular, a secure remote procedure call (RPC) is used to invoke operations on remote objects. Gateway server 14 also includes an operating system 28 and a threads mechanism 26.

Figure 3:
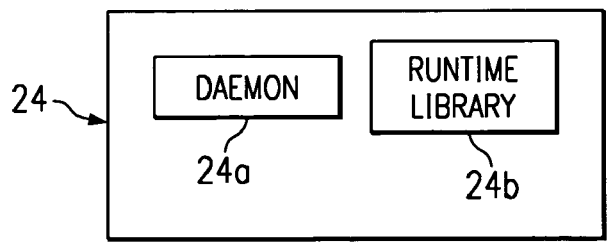
FIG. 3 is a block diagram of the elements that comprise the lightweight client framework ("LCF") client component of the system management framework.

The system management framework preferably includes a client component 24 supported on each of the endpoint machines, such as workstations 19. The client component 24 preferably is ⁂dataless⁂ in the sense that the system management data is not cached or stored there in a persistent manner. This is a known product called the Tivoli lightweight client framework ("LCF"). The LCF has two main parts as illustrated in FIG. 3: the LCF daemon 24a and an application runtime library 24b. The LCF daemon 24a is responsible for endpoint log-in and for spawning application endpoint executables. Once an executable is spawned, the LCF daemon 24a has no further interaction with it. Each executable is linked with the application runtime library 24b, which handles all further communication with the gateway. The runtime library includes a query agent that is started upon receipt of a management query and then is used to effectuate a given management operation.

Implementation of the management framework in this client-server manner has significant advantages, and it facilitates the connectivity of personal computers into the managed environment. Using an object-oriented approach, the system management framework facilitates execution of system management tasks required to manage the resources in the MR. Such tasks are quite varied and include, without limitation, file and data distribution, network usage monitoring, user management, printer or other resource configuration management, and the like.

Figure 4:
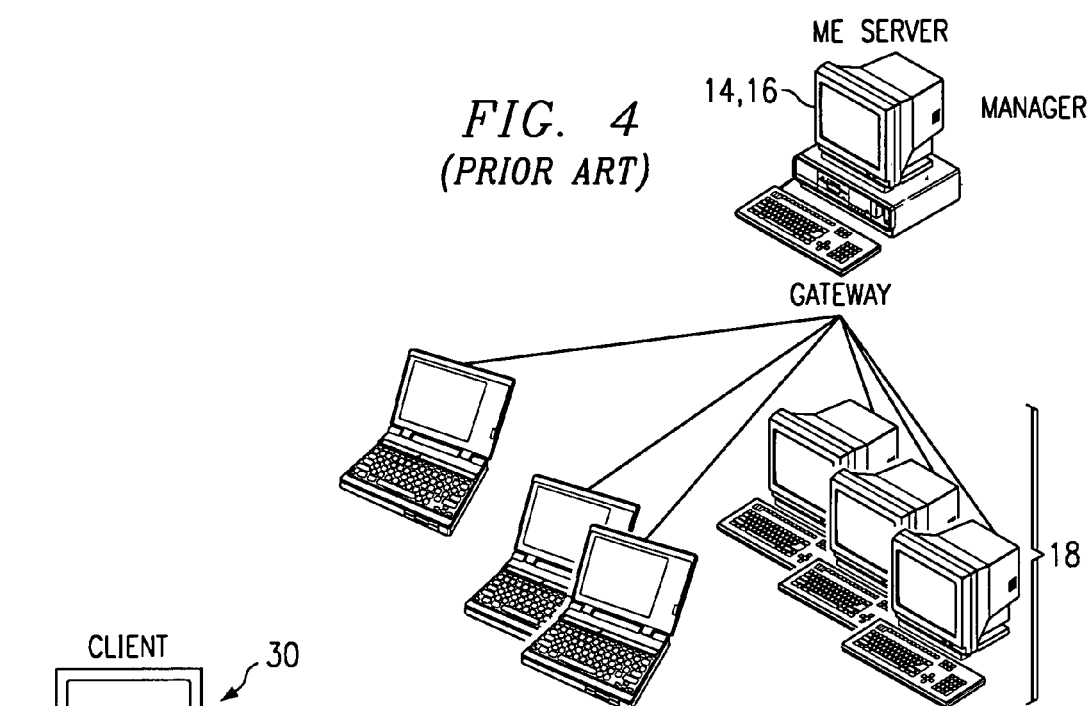
FIG. 4 illustrates a smaller ⁂workgroup⁂ implementation of the enterprise in which the server and gateway functions are supported on the same machine.

In the large enterprise such as illustrated in FIG. 1, preferably there is one server per MR with some number of gateways. For a workgroup-size installation (e.g., a local area network) such as illustrated in FIG. 4, a single server-class machine may be used as the server and gateway, and the client machines run the lightweight client framework (LCF) as previously described. References herein to a distinct server and one or more gateway(s) should thus not be taken by way of limitation, as these elements may be combined into a single platform. For intermediate size installations, the MR grows breadth-wise with additional gateways being used to balance the load of the end points.

The server is the top-level authority over all gateways and endpoints. In particular, the server maintains an endpoint list, which keeps track of every endpoint in a managed region. The list preferably contains all information necessary to uniquely identify and manage each endpoint including, without limitation, such information as name, location, and machine type. The server also maintains the mapping between each endpoint and gateway, and this mapping is preferably dynamic. As noted above, there are one or more gateways per managed region. Preferably, a gateway is a fully-managed node that has been configured to operate a gateway. As endpoints log in, the gateway builds an endpoint list for its endpoints. The gateway's duties preferably include: the setting for endpoint log-in requests, the setting for endpoint update requests, and (its main task) acting as a gateway for method invocations on endpoints.

The above-described framework is a known end-to-end, cross-platform network management scheme that provides a core set of management services and various management applications. As already noted, given management operations in the managed environment may be carried out by "agents". An agent is a specialized low-impact software module or routine that is deployed to a client node and that is useful for executing some local management task. Thus, for example, the management server may include a discovery mechanism that provides automatic discovery of managed nodes, gateways and connected managed regions. The mechanism deploys the software agents, which identify information about managed devices and make it available to a network managing system. A representative discovery mechanism of this type is described in more detail in Ser. No. 09/089,961, titled "System, Method And Computer Program Product For Discovery In A Distributed Computing Environment." That application is assigned to the assignee of the present invention and is incorporated herein by reference.

Figure 5:
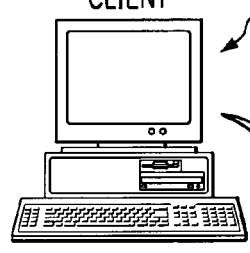
FIG. 5 is a simplified representation illustrating a set of manager objects for use in managing application types and their associated instances according to the present invention.
Figure 5:
Figure 5:
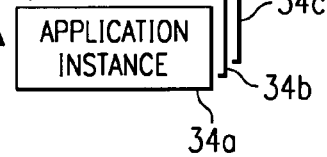
Figure 5:
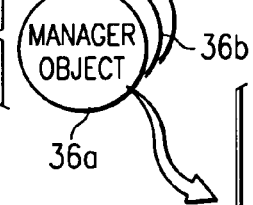
Figure 5:
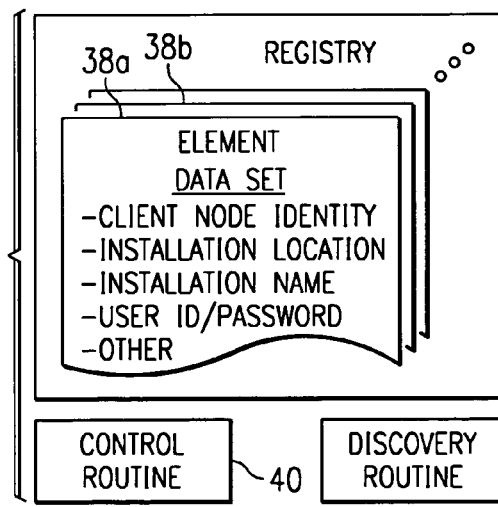

Referring now to FIG. 5, one of ordinary skill will appreciate that a given client machine 30 supports a plurality of software applications 32a–32n. Moreover, a set of one or more instances 34a–34n of a given software application 32 may be executing on the client machine at any one time. According to the present invention, a manager object 36a–36n is associated with a given application type for the purpose of managing that application (and its instances) directly. Each manager object 36 comprises two main elements: a registry 35, and a control routine 40. The registry 35 is preferably an array (or other suitable data structure, such as a linked list) comprising a set of elements 38a–n. Each element 38 comprises a data set of information representing a given context of an instance of the application. Thus, the manager object's registry 35 includes only one element 38 if only a single instance of the application is executing on the client computer. The control routine 40, as will be described below, is used to intercept a management query targeted to the application and to redirect the query to a given application instance managed by the manager object. The redirected query may differ from the original query by including context-specific information unique to an application instance.

Thus, according to the invention, a given client machine supports at least one application to be managed. As an application is started, a corresponding manager object is associated therewith. The manager object is then used to manage the application and its associated instances directly. The set of manager objects associated with a given client machine application type may be supported anywhere in the managed network (e.g., at a management server, at a gateway, or at another location). As also seen in FIG. 5, a given manager object may also include a discovery routine 42 for use in discovering application types (and their associated instance) on the client machine. The discovery routine is useful when manager objects are instantiated prior to their association with given applications. A given application (and its associated instances) also may be located by a manager object by having the manager object call a separate discovery mechanism, which then returns the results of the discovery process.

Thus, assume that a given client machine to be managed by the distributed framework includes Appl 1 (Lotus Notes), Appl 2 (Oracle) for use by the enterprise's accounting department, another instance of Appl 2, for use by the enterprise's human resources department, and Appl x (other). According to the invention, there would be three (3) manager objects: one for managing Appl 1, one for managing both instances of Appl 2, and one for managing Appl x. As noted above, each of the manager objects preferably includes a registry of data elements, with each element composed of a data set that includes context-specific information for a given application instance. The data set typically comprises client node identity, an installation location (e.g., directory), an installation identifier (e.g., database server name), and optional administrator username/password details. Of course, one of ordinary skill in the art will appreciate that other local contextual information and/or types may be incorporated into the data set.

Figure 6:
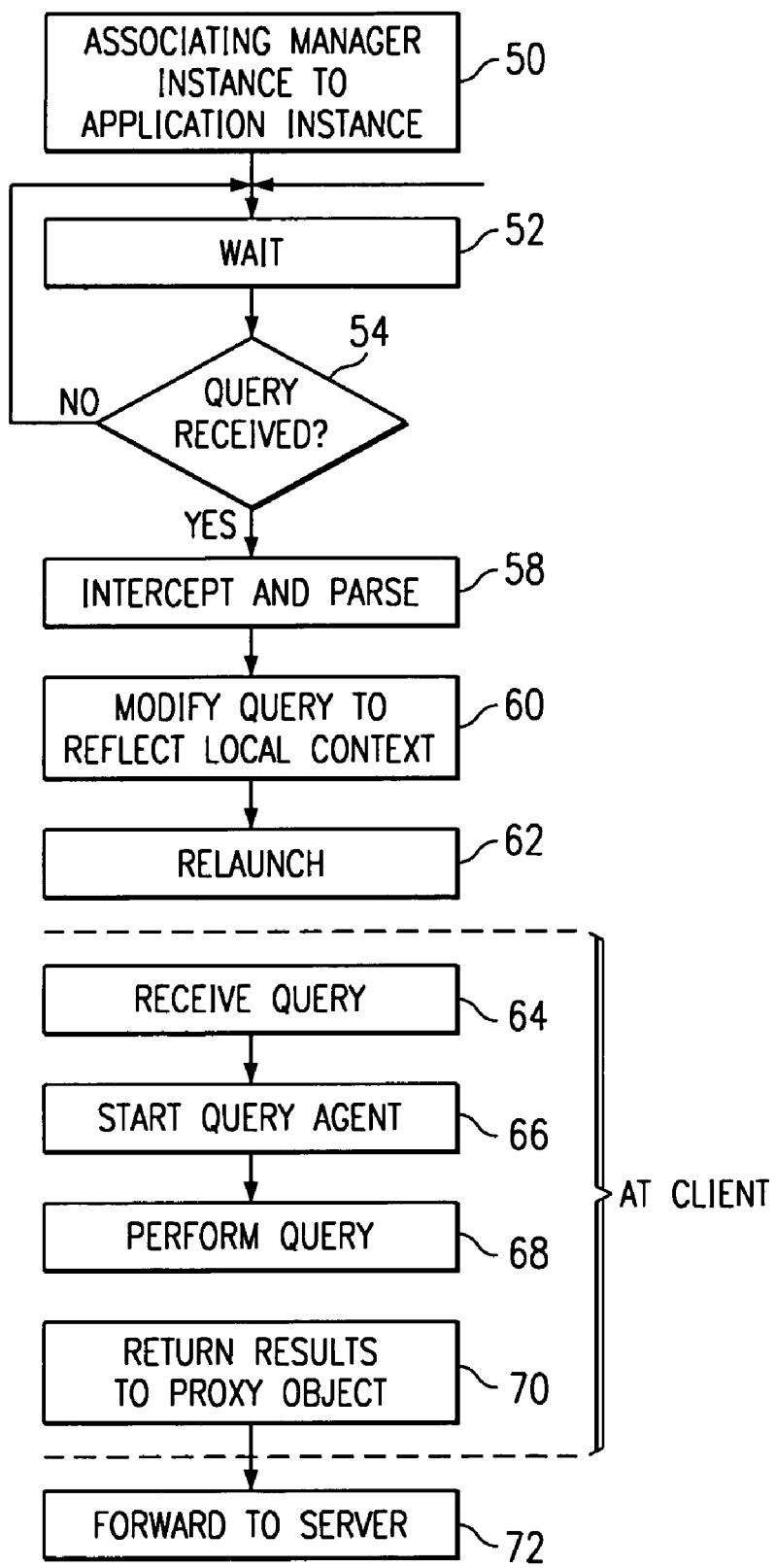
FIG. 6 is a flowchart illustrating a preferred operation of a manager object control routine according to the present invention.

FIG. 6 is a flowchart of a preferred operating routine of the manager object. The routine begins at step 50 by associating a manager object to a given application. As noted above, prior to this step, a discovery operation may have been carried out to identify the application type. At step 52, the manager object waits for a given management operation or query from the management server (or some other source). For the purposes of illustration, the remainder of the discussion shall describe manager object operation in the context of a management query, although one of ordinary skill in the art will appreciate that the operation described below is also used for any given management operation protocol.

A test is performed at step 54 to determine whether a query has been received. If not, the routine returns to step 52. If, however, a query has been received, the routine continues at step 58 to intercept and parse the request. Parsing the request enables the manager object to identify the application type and instance, if any, to which the query is directed. To this end, typically the query includes an identifier identifying the target application instance. Such information may be obtained by the management server, for example, by periodically polling the manager object's registry or via a request-response protocol between the server and the object. At step 60, the control routine may modify the query to reflect given context information in the object's registry (in particular, the data set of the given element corresponding to the identifier passed from the management server). This operation provides a much finer degree of control over the management operation. Thus, for example, if the original query was "how big is my Oracle database", the modified query is "how big is may Oracle database being operated by the accounting department" or the like. As can be seen, the application-specific query may be modified at step 60 to become application instance-specific. As used herein, a query may be "modified" by augmenting the query (as described) by substituting an alternate query, by processing the query (e.g., to add a security token), or by some combination of the above. Of course, it is not required that the query be modified.

At step 62, the control routine of the manager object relaunches the modified query to the client machine. The client machine receives the query at step 64. At step 66, a local query agent is launched. This is a conventional operation in the LCF framework described above. At step 68, the local agent parses the received query and performs the requested operation. At step 70, the results are returned back to the manager object. If no further processing is required, the manager object then returns the results of the query back to the requesting server. This is step 72. This completes the processing.

As can be seen, a given manager object is used to directly manage a given application type and, in particular, all instances of that application type. This operation provides significant advantages over the prior art, wherein management queries directed toward a given application cannot be specifically directed to a given application instance (e.g., because the local query agent in the dataless client does not start until receipt of the query). In addition, use of the manager object to manage a given application type (and/or application instance) enables finer granularity of access control. In particular, a server management operation may be directed to a particular application (or even a given application instance) without exposing the remainder of the client nodes to the operation. Further, use of the manager objects as described herein also provides the same scaleability advantages of an LCF architecture.

One of ordinary skill will appreciate that the control routine of a given manager object is a computer program executable by a processor on a given machine. One of the preferred implementations of the invention is as a set of instructions in a code module resident in the random access memory of a computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or even downloaded via the Internet.

The objects of this invention are achieved in a large distributed enterprise that includes computing resources organized into one or more managed regions, each region being managed by a management server servicing one or more gateway machines, with each gateway machine servicing a plurality of endpoint machines. As has been illustrated and described, a system management framework is preferably ▩distributed▩ on the gateway machines and the one or more endpoint machines to carry out system management tasks. Although the above environment is preferred, one of ordinary skill will appreciate that the inventive concepts may be implemented in smaller distributed client server network environments. Thus, the invention should not be construed to be limited to a particular large scale, distributed computing environment as described in the preferred embodiment.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Further, although the invention has been described in terms of a preferred embodiment in a specific network environment, those skilled in the art will recognize that the invention can be practiced, with modification, in other and different network architectures with the spirit and scope of the appended claims.

Having thus described our invention, what we claim as new and desire to secure by Letters Patent is set forth in the following claims.

The invention claimed is:

1. A method of managing a set of clients in a distributed computer network having a management server, comprising the steps of:
    associating a manager object to each application type on a given client, the manager object including a registry having a set of one or more elements, wherein each element includes information representing a context of an application instance; and
    managing all instances of the application through the manager object.

2. The method as described in claim 1 wherein the given client supports a dataless management framework.

3. The method as described in claim 1 wherein the dataless management framework includes a local agent that is controlled by the manager object to manage the application instance.

4. The method as described in claim 1 wherein the element includes information identifying a client node.

5. The method as described in claim 1 wherein the element includes information identifying a directory where the application instance is installed.

6. The method as described in claim 1 wherein the element includes information identifying a name of a resource where the application instance is installed.

7. The method as described in claim 1 wherein the application type is discovered by the manager object.

8. The method as described in claim 1 further including the step of discovering the application type prior to associating the manager object.

9. The method as described in claim 1 wherein the manager object is managed by the management server.

10. A method of managing a set of clients in a distributed computer network having a management server, comprising the steps of:
    for each client, establishing a set of manager objects, wherein each manager object is associated with a given type of application to be managed;

responsive to management operations initiated at the management server, managing a given client using the set of manager objects established for that client.

11. The method as described in claim 10 wherein the given client supports a dataless management framework.

12. The method as described in claim 11 wherein the dataless management framework includes a local agent that is controlled by the set of manager objects for the given client.

13. The method as described in claim 10 wherein each manager object includes a registry comprising a set of elements, wherein each element includes information representing a context of an application instance.

14. The method as described in claim 13 wherein the information comprises a client node identity, an installation location, and an installation identifier.

15. The method as described in claim 10 further including the step of discovering the application type.

16. The method as described in claim 10 further including the step of registering the application type with the manager object.

17. A manager for use in managing an application type, the manager executing on a client machine, comprising:
   a registry comprising a set of one or more data elements, each element including information representing a context of an application instance; and
   a control routine (a) for intercepting a query directed to the client machine, (b) for modifying the query as a function of the information; and (c) for redirecting the modified query to the client machine to target management of the application instance.

18. The manager object as described in claim 17 further including a routine for discovering application types executing on the client machine.

19. The manager object as described in claim 17 wherein the information identifies a client node.

20. The manager object as described in claim 17 wherein the information identifies a directory where the application instance is installed.

21. The manager object as described in claim 17 wherein the information identifies a name of a resource where the application instance is installed.

22. A computer program product in a computer-readable medium and executable on a given computer for use in managing an application type executing on a client machine, comprising:
   means for intercepting a query directed to the client machine for managing the application type;
   means for modifying the query with information representing a context of a given application instance identified in the query; and
   means for redirecting the modified query to the client machine to target management of the given application instance directly.

23. A framework for managing a set of clients, comprising:
   a management server to which the set of clients are connectable; and
   for each client, a set of manager objects, wherein each manager object is associated with a given type of an application to be managed at the client and is responsive to management operations initiated at the management server for managing one or more application instances directly.

* * * * *